June 9, 1964   W. T. FLEMING   3,136,327
PRESSURE REGULATING VALVE
Filed Dec. 13, 1961   2 Sheets-Sheet 1

INVENTOR
WILLIAM T. FLEMING
BY
AGENT

INVENTOR
WILLIAM T. FLEMING
BY
AGENT

United States Patent Office 3,136,327
Patented June 9, 1964

3,136,327
PRESSURE REGULATING VALVE
William T. Fleming, Boonton, N.J., assignor to Specialties Development Corporation, Belleville, N.J., a corporation of New Jersey
Filed Dec. 13, 1961, Ser. No. 159,130
7 Claims. (Cl. 137—116.5)

The present invention relates to valves, and, more particularly, to pressure regulating valves.

An object of the present invention is to provide a novel and improved pressure regulating valve.

Another object is to provide such a valve which is compact and capable of providing close regulation.

Another object is to provide such a valve which is capable of providing a closely regulated output pressure of extremely low value.

Another object is to provide such a valve which has high gain and low hystersis.

Another object is to provide such a valve incorporating a pressure relief device.

A further object is to provide such a valve having a pressure relief valve incorporated in the pressure responsive member thereof.

Other and further objects of the invention will be obvious upon an understanding of the illustrative embodiment about to be described, or will be indicated in the appended claims, and various advantages not referred to herein will occur to one skilled in the art upon employment of the invention in practice.

In accordance with the present invention the foregoing objects are accomplished by providing a pressure regulating valve comprising a casing formed with a chamber therein, high pressure gas inlet means and low pressure gas outlet means in the casing in fluid flow communication with the chamber, valve means for the inlet, valve closing spring means for urging the valve means closed, lever means engaging the spring means, lever operating means for moving the lever means to oppose the valve closing spring means, and piston means responsive to the pressure in the chamber interposed between the lever means and the lever operating means for opposing the action of the lever operating means.

A preferred embodiment of the invention has been chosen for purposes of illustration and description, and is shown in the accompanying drawings, forming a part of the specification, wherein.

Figure 1:
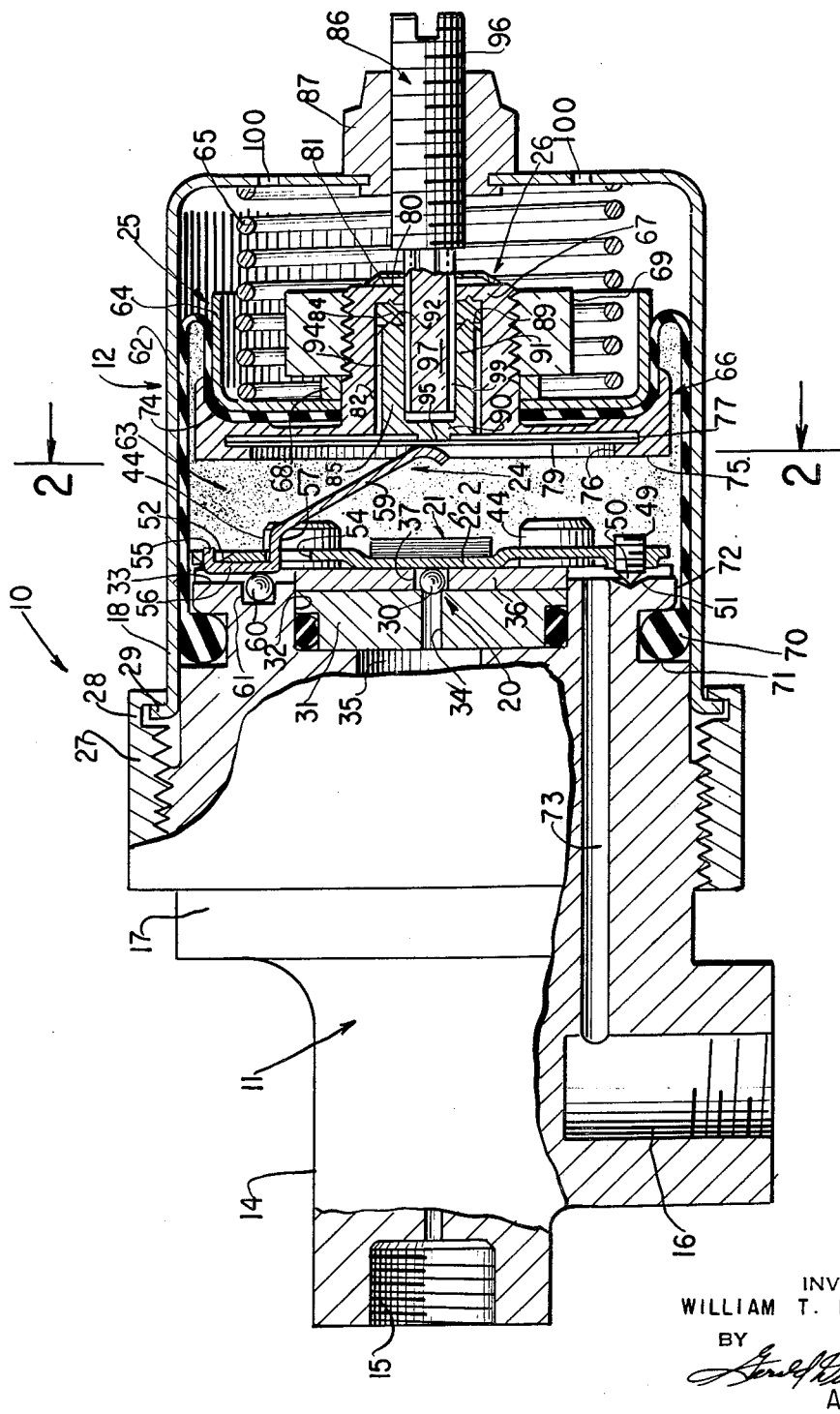
FIG. 1 is a longitudinal sectional view of a pressure regulating valve in accordance with the present invention.

Referring to the drawing in detail, there is shown a two stage pressure regulator 10 incorporating a conventional first stage pressure regulating mechanism 11 (not shown in detail) and a second stage pressure regulating valve 12 constructed in accordance with the present invention.

The regulator 10 includes a body 14 having an inlet port 15 through which high pressure gas is supplied to the first stage 11, and an outlet 16 to which low pressure gas is delivered from the second stage regulating valve 12. The body 14 has a cylindrical portion 17 upon which the regulating valve 12 is mounted.

The regulating valve 12 includes a casing 18, an inlet valve 20, a spring member 21 for biasing the valve 20 closed, a pair of levers 22 and 24 engaging the spring member 21, a spring loaded diaphragm mechanism 25 for operating the levers 22 and 24 to control the valve 20, and a pressure relief valve 26 within the mechanism 25.

The casing 18 is cup-shaped and the open end thereof is fitted over the cylindrical portion 17 of the body 14 and adjustably secured thereto by means of a nut 27 threaded onto the body portion 17. The nut 27 is fitted over the end of the casing 17 and is coupled thereto by the interengagement of an internal groove 28 in the nut 27 and an outwardly extending flange 29 on the casing 18.

The inlet valve 20 includes a spherical valve member 30 and a valve seat member 31 set into a recess 32 in the end surface 33 of the body portion 17. The seat member 31 has a passageway 34 extending therethrough from the outlet 35 of the first stage, and a disc 36 is positioned against the surface of the member 31 and is provided with a bore 37 aligned with the passageway 34 for retaining and guiding the valve member 30.

Figure 2:
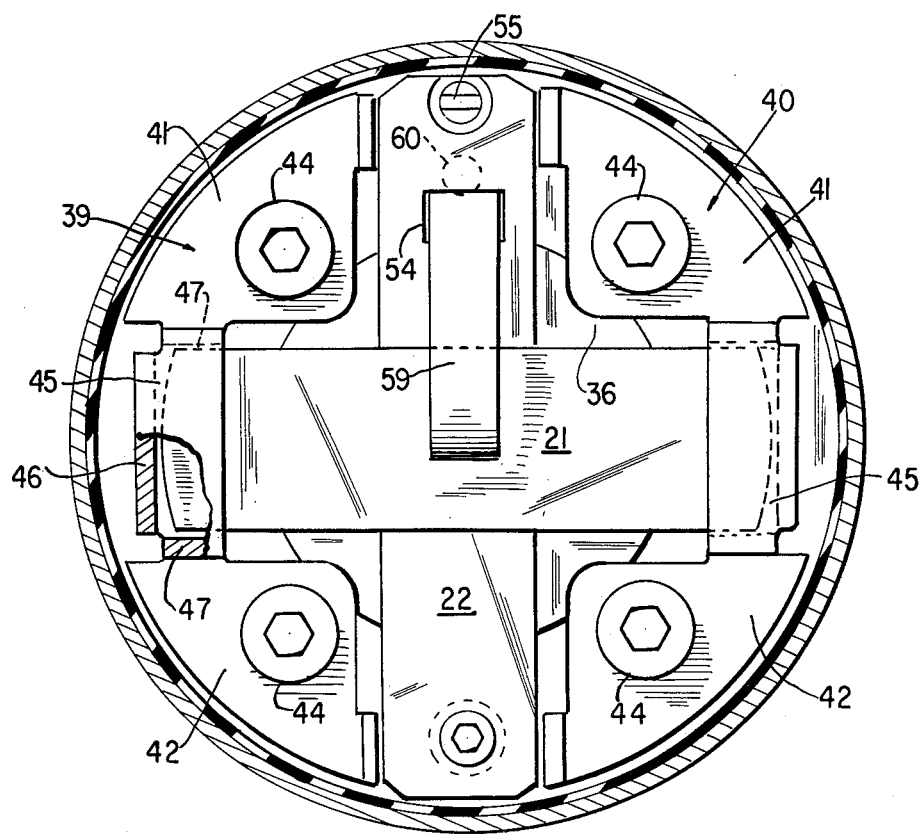
FIG. 2 is a sectional view taken along the line 2—2 on FIG. 1.

The spring member 21 is composed of six thin spring leaves stacked together and secured at each end to the surface 33 by a pair of brackets 39 and 40. Each of the brackets, as shown in FIG 2, include generally triangular upper and lower plate sections 41 and 42 secured to the body portion 17 by bolts 44 and connected together by a spring engaging section 45 provided with an end wall 46 and side walls 47 to confine the ends of the spring member 21.

The lever 22 is positioned perpendicular to the spring member 21 and is interposed between the spherical valve member 30 and the center portion of the spring member 21. A screw 49 having a conical point 50 on the end thereof is threaded through the lower end of the lever 22 and engages a shallow conical recess 51 in the surface 33 to provide the pivot point of the lever 22. A conical aperture 52 is provided in the lever 22 at the upper end thereof and a rectangular aperture 54 is provided therein below the conical aperture 52.

The lever 24 interlocks with the lever 22 and is composed of a short horizontal end section 55 extending through the conical aperture 52 toward the surface 33, a vertical section 56 extending from the aperture 52 to the aperture 54 along the surface of the lever 22 facing the surface 33, a horizontal section 57 extending through the aperture 54 away from the surface 33, and a long end section 59 extending downwardly at an angle away from the aperture 54 to the intersection of the axis of the passageway 34. The lever 24 pivots upon a ball 60 seated in a recess 61, provided in the surface 33 slightly above the aperture 54, and is held between the ball 60 and the lever 22 by the action of the spring member 21 against the lever 22.

The diaphragm mechanism 25 includes a generally cup-shaped rolling diaphragm 62 nested within the casing 18 providing a pressure chamber 63, a cup shaped diaphragm guide 64 between the closed end of the diaphragm and the closed end of the casing 18, a coil spring 65 biasing the guide 64 away from the closed end of the casing 18, a diaphragm retainer 66 positioned within the chamber 63 and having a formation 67 extending through the diaphragm 62 and the diaphragm guide 64, a washer 68 positioned on the formation 67 within the diaphragm guide 64, and a nut 69 threaded on the formation 67 to bear against the washer 68 and lock the diaphragm 62 between the guide 64 and the retainer 66.

The diaphragm 62 is provided with a ring shaped annular formation 70 at the open end thereof and the body portion 17 is provided with an annular recess 71 for receiving the formation. The casing 18 holds the formation 70 within the recess 71, and the body portion 17 has a reduced diameter section 72 between the recess 71 and the surface 33 to provide an annular space between the casing 18 and the body portion 17 for the wall of the diaphragm 62. The pressure chamber 63 is connected to the outlet 16 by means of a passageway 73 in the body 14.

The diaphragm retainer 66 has a concave surface 74 dimensioned to cooperate with the convex surface of the diaphragm guide 64 to hold the diaphragm 62 securely therebetween. The opposite surface 75 of the retainer 66 is provided with a stepped annular recess including an outer portion 76 intersecting the surface 75 and a concentric inner portion 77 of larger diameter. An elongated spring 79 similar to the leaves of the spring member 21 is positioned within the inner recess portion 77 to engage the end 59 of the lever 24. The formation 67 of the diaphragm retainer 66 is provided with a stepped bore including a short small diameter portion 80 intersecting the end surface 81 of the formation 67 and a larger diameter portion 82 extending from the bore portion 80 to the inner recess portion 77.

The pressure relief valve 26 includes an annular valve seat 84 positioned at the end of the bore portion 82, a cup shaped valve member 85 positioned within the bore portion 82 to cooperate with the valve seat 84, and a relief valve adjusting member 86 supported by a bushing 87 mounted in the closed end of the casing 18.

The annular valve seat 84 is provided with a seating surface 89 and has an inner diameter which is slightly larger than the diameter of the bore portion 80. The valve member 85 has an end wall 90 and an annular side wall 91 provided with an annular ridge 92 on the free end thereof for engaging the surface 89 of the seat 84. The side wall 91 is provided with a plurality of longitudinal grooves 94 on the outer surface thereof for conducting gas to the relief valve 26, and the end wall 90 is provided with a central projection 95 aligned with the end of the lever 24 for engaging the spring 79.

The relief valve adjusting member 86 includes a screw portion 96 threaded into the bushing 87 and a cylindrical stop portion 97 extending from the screw portion 96 through the bore 80 into the valve member 85. The stop portion 97 is provided with a plurality of grooves 99 extending longitudinally along the outer surface thereof for transporting gas from the relief valve to the rear of the diaphragm 62. A plurality of apertures 100 are provided in the closed end of the casing 18 to place the area to the rear of the diaphragm 62 in communication with the atmosphere.

In operation, a high pressure gas supply, for example a source of oxygen at 5000 pounds per square inch, is connected to the inlet port 15. The first stage pressure regulating mechanism 11 effects a reduction of this pressure and supplies gas at a pressure in the order of 150 p.s.i. to its outlet 35.

When the pressurized gas is initially introduced into the regulator 10, the chamber 63 of the second stage regulating valve 12 is at atmospheric pressure and the spring 65 biases the diaphragm retainer 66 toward the inlet valve 20 causing the spring 79 to exert a force on the end of the lever 24. In response to this force, the lever 24 pivots on the ball 60 and causes the lever 22 to pivot away from the valve 20 against the action of the spring member 21. The spherical valve member 30 is thus permitted to separate from the valve seat member 31.

The gas at the outlet 35 of the first stage regulating mechanism 11 flows through the passageway 34 and past the spherical valve member 30 into the chamber 63 where it expands to a lower pressure and then flows through the passageway 73 to the outlet 16. As the pressure in the chamber 63 increases, the diaphragm retainer 66 is moved against the spring 65 reducing the force exerted on the lever 24 and thus allowing the spring 21 to move the valve member 30 toward the seat 31 to restrict the flow through the valve 20. When the pressure in the chamber 63 reaches the desired value, the diaphragm retainer 66 is positioned so that the valve 20 admits gas to the chamber 63 at a rate sufficient to maintain the desired pressure. Any change in the pressure at the outlet 35 of the first stage regulator 11 causes the retainer 66 to change its position so as to re-adjust the flow rate through the valve 20 in order to maintain the desired pressure in the chamber 63. In this manner the regulator valve 12 supplies gas to the outlet port 16 at a closely regulated low pressure. For example, such units have been constructed which are capable of reducing a first stage output pressure varying between 150 p.s.i. and 250 p.s.i. down to an output pressure which is held between 0.8 p.s.i. and 1.2 p.s.i.

The output pressure may be adjusted by means of the nut 27 when the regulator is in operation.

In the event that the pressure in the chamber 63 increases beyond a predetermined value, due to a sudden pressure surge or a malfunction of the valve 20, the retainer 66 is moved away from the inlet valve 20 a distance which is greater than normal. During this movement of the retainer 66, the valve member 85 is restrained by engagement with the stop portion 97 of the adjusting member 86, and the valve seat 84, which continues to move with the retainer 66, separates from the valve member 85 to open the relief valve 26 and allows gas to flow from the chamber 63 to the atmosphere through the grooves 94, the grooves 99, and the apertures 100.

It will be seen from the foregoing that the present invention provides a novel and improved pressure regulating valve which is compact, capable of providing a closely regulated low pressure output, and incorporates a pressure relief valve within the pressure responsive member thereof.

As various changes may be made in the form, construction and arrangement of the parts herein, without departing from the spirit and scope of the invention and without sacrificing any of its advantages, it is to be understood that all matter herein is to interpreted as illustrative and not in any limiting sense.

I claim:

1. A pressure regulating valve comprising a body provided with a cylindrical portion having an end surface, a cup shaped casing facing said end surface and secured to said cylindrical portion, a cup shaped flexible diaphragm within said casing having an open end in sealing relationship with said cylindrical portion to form a chamber having said end surface as one wall thereof, high pressure gas inlet passageway means and low pressure gas outlet means in said body in fluid flow communication with said chamber, valve means in said inlet passageway means, an elongated flat spring member secured to said body and extending across said end surface for urging said valve means closed, a first lever between said valve and said spring member extending across said end surface at an angle to said spring member, said lever having a pivoted end adjacent one edge of said end surface and a movable end adjacent the opposite edge of said end surface, a second lever having a first portion positioned between said end surface and said movable end of said first lever and having a second portion extending away from said end surface, means on said surface providing a pivot for said second lever, and lever operating means including a formation carried by said diaphragm for engaging said second portion of said second lever and a spring positioned between said diaphragm and said casing.

2. A valve according to claim 1, wherein said inlet passageway means includes an end portion intersecting said end surface substantially at the center thereof, said inlet passageway means also includes a valve seat therein adjacent said end surface, and said valve means includes a ball shaped member in said end portion of said passage way means for cooperation with said valve seat.

3. A valve according to claim 1, wherein said first lever is held in position by said flat spring and said second lever is interlocked with said first lever to be supported thereby.

4. A valve according to claim 3, wherein said first lever is provided with first and second openings adjacent said movable end, said second lever is provided with an end portion extending from said first portion through said first opening, and said second portion of said second lever extends through said second opening from said first portion, whereby said second lever is interlocked with said first lever.

5. A valve according to claim 4, wherein a ball is mounted in said end surface in contact with said first portion of said second lever to provide said pivot means for said second lever.

6. A valve according to claim 1 including means for adjustably positioning said casing on said cylindrical body portion to adjust the outlet pressure delivered by the valve.

7. A valve according to claim 1, including relief valve means in said formation of said lever operating means, and means on said casing for operating said relief valve means in response to excessive movement of said formation in response to excessive pressure in said chamber.

References Cited in the file of this patent

UNITED STATES PATENTS

| | | |
|---|---|---|
| 1,970,806 | Lidseen | Aug. 21, 1934 |
| 2,701,578 | Hamilton | Feb. 8, 1955 |

FOREIGN PATENTS

| | | |
|---|---|---|
| 590,784 | France | Mar. 25, 1925 |